United States Patent [19]

Moran et al.

[11] 3,873,273

[45] Mar. 25, 1975

[54] AUTOMATIC CHEMICAL TESTING SYSTEM

[75] Inventors: John Joseph Moran; Sverre Wolff; Holvor Walter Ashley, all of Houston, Tex.

[73] Assignee: Hycel, Inc., Houston, Tex.

[22] Filed: Oct. 15, 1973

[21] Appl. No.: 406,258

[52] U.S. Cl.............. 23/253 R, 23/259, 356/222, 356/246
[51] Int. Cl...................... G01n 33/16, G01n 21/26
[58] Field of Search...... 23/253 R, 259, 292, 230 B; 356/39, 222, 246

[56] References Cited
UNITED STATES PATENTS
3,607,099  9/1971  Scordato et al................... 356/39 X
3,706,499  12/1972  Rapoza et al................. 23/292 UX

Primary Examiner—R. E. Serwin
Attorney, Agent, or Firm—Harry W. Barron; Timothy L. Burgess

[57] ABSTRACT

Portable automatic chemical testing laboratory which can be used in a physician's office to test for various substances found in blood. The portable laboratory includes an incubation table having a series of holes therein. Associated with each hole is detector means for providing a signal manifesting the color transmittance in the hole. Certain of the holes and associated detector means are each assigned to performing a selected test and at least one other hole and associated detector, together with timers used to set the time or times at which the color transmittance in the other hole is to be detected, can be used to perform any one of a plurality of other tests. The portable laboratory also includes a series of function buttons and channel buttons, displays, and means for printing the test results.

18 Claims, 9 Drawing Figures

AUTOMATIC CHEMICAL TESTING SYSTEM

This invention relates to a chemical testing system and more particularly to an automatic chemical testing system for testing various constituents of blood serum.

One of the most effective tools which a physician uses in diagnosing illness is the blood test. The physician can, in many instances, diagnose a particular illness and successfully treat it with only having the results of one or a few blood tests. These tests will tell whether a particular constituent of the blood is high or low and proper treatment will be indicated by the results of the particular blood tests. Presently, when a physician desires a particular test to be run he must send blood samples to a central laboratory which specializes in running these tests, because, according to present state of the art techniques, these tests are performed either manually by specially trained technicians or on large complicated and expensive automatic chemical test instruments, such as the one described in the U.S. Pat. No. 3,622,279 entitled "Automatic Chemical Testing Apparatus," by John J. Moran and assigned to the present assignee. Naturally, when the physician sends blood to be tested to a central laboratory, he is unable to obtain the results while the patient remains in his office. Thus, treatment will be delayed, There exists a number of less complicated and less expensive portable automatic blood testers which could be used directly in the physician's office. However, none of these testers is so fully automatic that a person with very little training can operate them. For the portable blood testing laboratory system to be practical, it is a necessity that the operation thereof be as simple as possible because a physician is not in a position to employ a full time highly trained, technician solely to operate the machine; rather, his nurse or the physician himself will operate the machine. Thus, the machine must be very simple to operate and to be prepared for operation.

A further requirement for any portable blood testing laboratory is that it must be versatile. It is known that only certain tests are most frequently performed, however, there are many more tests available to be performed. To be practical, any portable blood testing laboratory should be capable of performing the most common tests with minimal human intervention yet still be capable of performing other less frequent tests with simple and quick human intervention. Further, the portable laboratory must be programmable, that is, some manner of selecting only those tests desired must be provided. Also, the portable laboratory must be flexible so that as new test are developed, they can be easily incorporated into the testing sequence.

In accordance with one perferred embodiment of this invention, there is provided an automatic chemical testing apparatus for detecting the amount of at least one given chemical substance in a liquid sample. For each given substance to be detected, said sample is first mixed with at least one predetermined chemical reagent in a reaction vessel, whereby said mixture undergoes a detectable change in proportion to the amount of that given substance present in said sample, the change being manifested by detecting energy passing through said mixture. The apparatus comprises a plurality of vessel holding chambers, each chamber including means for sensing the insertion therein and providing a presence signal indicating the insertion in a given chamber of a vessel. Each chamber further includes energy associated therewith and means for providing an energy path for the energy to and through each of said plurality of chambers each vessel being inserted in a chamber so that said energy passes through the mixture in that vessel. The apparatus further includes a detector means associated with and positioned in juxtaposition with each chamber so that the energy applied from the energy source to and through the chamber is applied to the detector means. The detector means provides a signal manifesting the energy applied thereto. Additionally, the apparatus includes control means responsive to the detector signals provided from detectors associated with those chambers having said presence signal provided therefrom, for measuring each detector signal at least one time at a prescribed time or times after the vessel was inserted in the chamber and for providing a signal manifesting the amount of each given substance.

A detailed description of the automatic chemical laboratory of this invention is hereinafter given with specific reference being made to the following FIGURES, in which.

Figure 1:
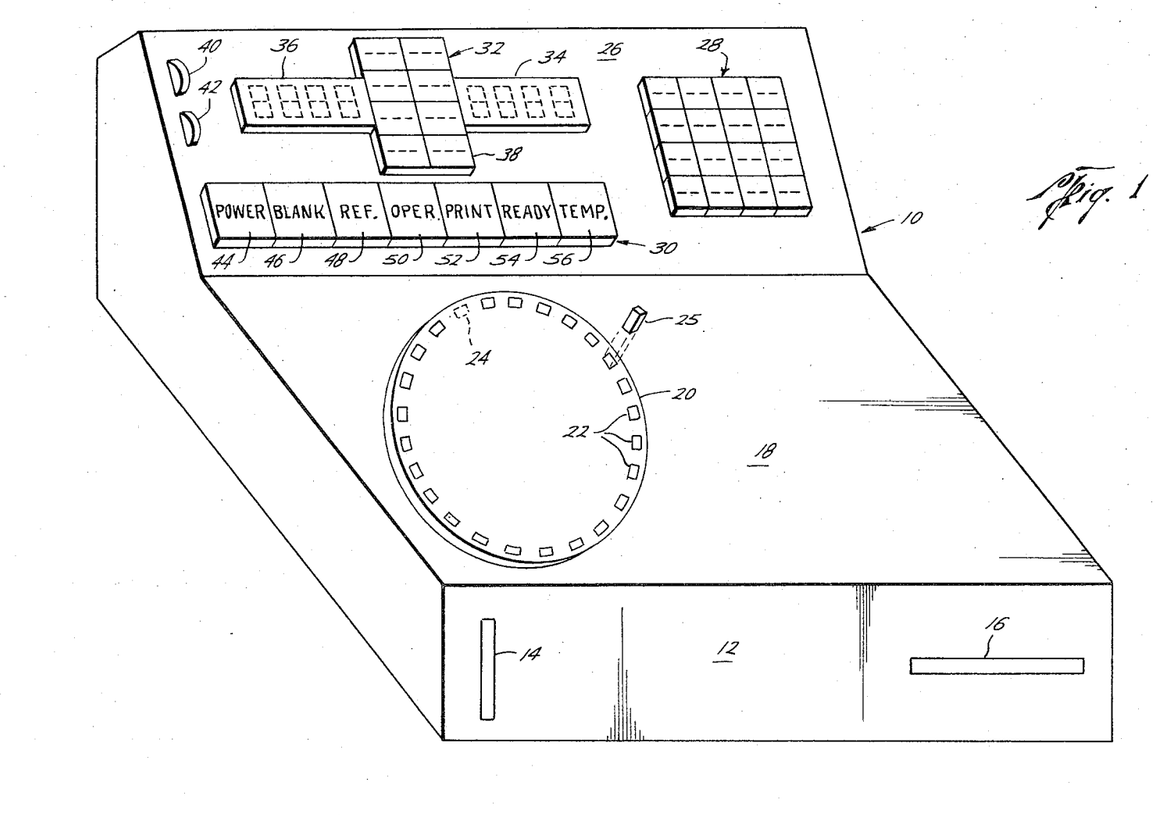
FIG. 1 is a three dimensional view of the automatic chemical testing apparatus of this invention.

Referring now to FIG. 1, a three dimensional view of automatic chemical testing apparatus 10 of this invention is shown. Apparatus 10 includes a front panel 12 having an essay card slot 14 and a printout card slot 16. In addition, apparatus 10 includes a work area 18 on which a sample holder and circular incubator table 20 is placed. Table 20 has twenty-four square holes, twenty-two located around the circumference thereof. Sixteen of the twenty-four holes 22 are assigned to test channels and the remaining eight holes 22 are merely for incubation. Of the sixteen test channels, fifteen are dedicated to a particular test and the sixteenth is variable, that is, any one of a number of tests can be performed therein. Table 20 also has a blank 24 located beneath the surface thereof between two or the square holes and of a size approximately equal to one or the square holes and of a size approximately equal to one of the square holes 22. Although not shown in FIG. 1 a Xenon lamp or other light source which provides near ultraviolet and visible light is placed in the center of table 20. Light passageways, not shown, between the Xenon lamp and the sixteen holes 22 assigned to test channels are also beneath the surface of table 20. Also, not shown in FIG. 1, are sixteen detectors placed on the outside of and associated with each of the sixteen holes assigned to test channels. Each of these detectors is capable of providing a signal manifesting the presence and the transmittance of anything placed in the hole 22 associated therewith.

For each of the tests capable of being performed by apparatus 10, it is necessary to first mix a specified amount of blood serum obtained from the tested patient's blood with one or a combination of reagents specified for that test in a cube like vessel 25 which can fit in a hole 22. Hereinafter, this vessel will be referred to as a tube, although it is neither a test tube nor even tubular. The reagents necessary to perfrom each test are well known from the prior art. These reagents react with the blood serum by causing an ultraviolet or a visible color change to occur over a given time. This time can be lessened if the mixture is heated. The amount and/or rate of this color change is proportional to the amount of the substance being tested which is present in the patient's blood. Thus, to measure the tested for substance, the amount and/or rate of change of color in the prepared mixture may be measured and then converted to standard concentration units. The color may be measured by focusing light through the mixture and through an interference filter of an appropriate wavelength to a photosensitive device which provides a signal having a magnitude proportional to the amount of light focused thereon.

For some tests, it is only necessary to measure the color a given time after the prepared mixture is placed in the proper one of the holes 22. This type of test is hereinafter referred to an an end-point reaction. For other tests, it is necessary to make two measurements of the color at two different times after the prepared mixture is placed in the proper hole 22. This type of test is hereinafter referred to as a dual-reading reaction. It should be noted that the time at which each particular test is to be measured is different, and that this time is measured from the time the prepared mixture is placed in the hole 22 of sample table 20.

As previously mentioned, fifteen of the sixteen channels have a specific tests assigned thereto, or in other words, are dedicated channels. Thus, it is necessary that when any one of these fifteen tests is to be performed, the proper amount of blood serum must be mixed with the proper reagents for that test, and the mixture must be placed in the proper hole 22 associated with that channel to which that one test is assigned. For tests other than those assigned, the blood serum must be mixed with reagents for that test and the mixture is placed in the remaining, or variable, hole 22 associated with the variable channel.

Apparatus 10 further includes a control area 26 which includes a series of sixteen channel buttons 28, a function control panel 30 with seven control buttons, a display area 32 which includes a three and one-half character numeric display 34, a four character numeric display 36, and a message display 38. Further, control area 26 includes a pair of timer controls 40 and 42 each of which may be set to any desired time. These timers control the times at which the color of the mixture in the variable channel is to be read.

Each of the sixteen channel buttons 28 is associated with one of the sixteen channels on table 20. Beneath each of the channel buttons 28 is a light which may be turned on in either a steady fashion or in a flashing fashion. In operation, the light beneath a particular channel button 28 will come on at the time the test associated with that particular channel has been completed. If the button is then depressed, the light therebeneath will begin to flash and the test result will be displayed on display 34. As long as the result is displayed on display 34, the button will continue to flash. Further, one of the channel buttons 28 may be flashing and a message appearing on message display 38. This indicates that the message relates to the particular channel with which the flashing button is associated.

The seven buttons on function control panel 30 are a Power button 44, a Blank button 46, a Reference button 48, an Operate button 50, a Ready button 52, a Print button 54, and a Temperature button 56.

Each of the buttons 44 through 56 (even numbers only) has a light therebeneath, which light is caused to be illuminated when the function of the particular button is being performed. The depression of Power button 44 causes power to be applied to the machine and it is necessary to depress this button prior to anything else. When the machine is ready to be shut down, the button is again depressed.

Blank button 46 may be depressed each time power is applied to the machine, such as at the beginning of each day. It causes a blank reading to be made for subsequent comparison purposes, that is a reading with empty tubes inserted into holes 22. If Blank button 46 is depressed, when one or more tubes are in holes 22, a message will flash on message display 38 saying, for instance, "Remove Tubes."

Reference button 48 is depressed when it is desired to calibrate the machine, which again may be done whenever power is applied thereto. After the Reference button 48 is depressed and the light therebeneath becomes illuminated a control serum having known amounts of the various substances capable of being detected, is mixed in proper amounts with those of the fifteen reagents for which referencing is desired. Each mixture is then placed in the proper one of each of the fifteen dedicated channels. At the same time an assay card having the known values stored thereon in proper order is inserted into slot 14 on front panel 12. The assay card inserted into slot 14 may be any type of card from which information can be derived, such as a data processing card having holes punched therein, or a magnetic card which has been magnetically encoded with the desired information. In response to the depression of Reference button 48 and the insertion of proper control serum-reagent mixtures in the channels desired to be referenced, readings will be taken at the appropriate times and a scaling factor will be determined by finding the ratio of the concentration unit values manifested by the assay card inserted in slot 14 and the optical transmittance values actually read from the channels being referenced. This scaling factor will than be stored for use later in the operation of apparatus 10 when unknown amounts of substances are being measured, so that the results can be given in concentration units.

When Operate button 50 is depressed and the light therefor becomes illuminated, mixtures of the patient's blood serum and appropriate reagents are ready to be placed in the desired ones of the sixteen test channels. It should be noted that it is not necessary to run all sixteen tests for a particular serum sample; rather only the desired tests need be run. This is done by preparing a serum-reagent mixture for each desired test and then inserting each mixture in the proper one of the holes 22 associated with the channel dedicated to that particular test. When each of the selected tests is finished, the light associated with the channel button 28 for that test becomes illuminated and when all of the tests are finished the light associated with Print button 52 becomes illuminated. Once a test is finished, and the light beneath the channel button 28 associated with that test becomes illuminated, the test results can be displayed on display 34 by depressing that channel button 28. This causes the light beneath that channel button 28 to begin blinking and it remains blinking as long as the results of that test remain displayed on display 34.

When the Print button 52 becomes illuminated, all of the tests are complete. A depression of Print button 52 at this point causes the print card, which should previously have been inserted in print card slot 16, to have the results of the tests performed printed thereon. After all of the test results are printed, the Remove Tubes message is displayed on message display 38. When all of the tubes have been removed, the Remove Tube message goes out and the light beneath Ready button 54 becomes illuminated.

Ready button 54 serves no function when depressed. However, when the light therebeneath becomes illuminated, samples may be placed into the holes 22 of sample table 20.

Temperature button 56 is pressed whenever the temperature of table 20 is desired to be known. When temperature button 56 is depressed the temperature is displayed on display 34 and the light beneath the temperature button 56 flashes. If the temperature of table 20 is not proper, the light beneath Ready button 54 cannot go on, so no tests can be then performed.

Display 36 is a clock in minutes and seconds which tells the time which has elapsed since the first sample had been placed in one of the holes 22 on table 20. Display 36 may also be designed to display the time since the last sample was placed in a hole 22 of sample table 20 or to display the time remaining until all test results are obtained.

Some of messages provided by message display 38 have heretofore been described and others will be described when the operation shown in FIGS. 3 thru 9 is discussed hereinafter. As previously mentioned display 34 displays either the test results obtained when one of the channel buttons 28 is depressed or the temperature of table 20 when Temperature button 56 is depressed. Display 34 is a three and one-half character display, that is, it can display any number up to 1999 with a decimal point being capable of variable positioning.

Figure 2:
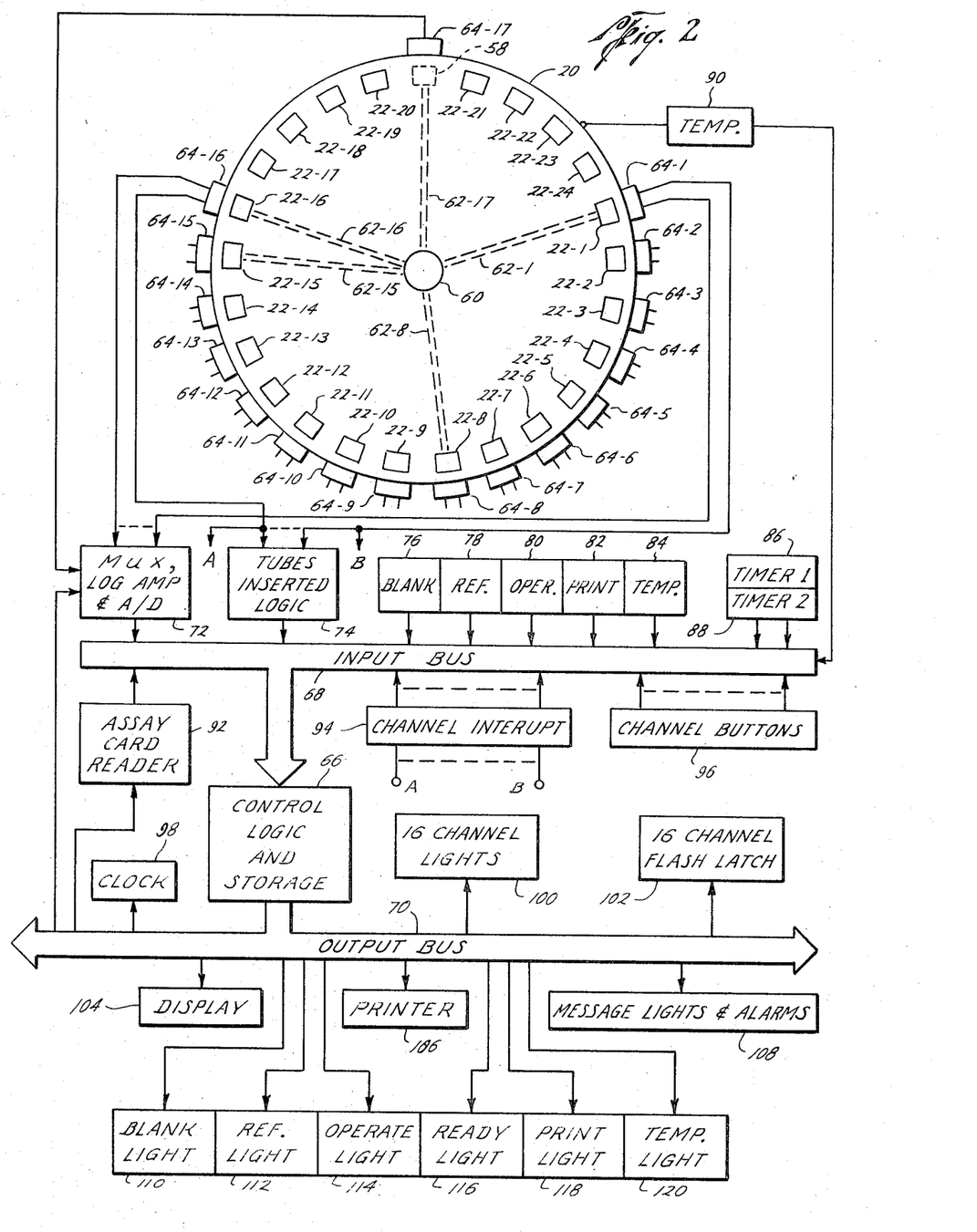
FIG. 2 is a block diagram of the electrical aspects of the apparatus shown in FIG. 1.

Referring now to FIG. 2, a block diagram of the electrical aspects of apparatus 10 is shown. As previously mentioned, table 20 includes 24 square holes 22-1 thru 22-24 placed around the circumference thereof. Fifteen of the square holes 22-1 thru 22-15 are dedicated to preselected tests. One of the square holes 22-16 is used for a variable test, that is for any one of a plurality of other available tests which are not selected for the dedicated square holes 22-1 thru 22-15. The remaining eight holes 22-17 thru 22-24 are not used for testing samples, but rather serve merely as incubator blocks which may be used for sample preparation or not used at all, as desired. An area 58 beneath the surface of table 20 is included and has nothing therein.

At the center of table 20 is an area in which an energy source providing both visible and ultraviolet light, such as Xenon lamp 60, is placed. A plurality of optical paths 62-1 thru 62-17 (of which only 62-1, 62-8, 62-15, 62-16 and 62-17 are shown) is provided between Xenon light source 60 and the circumferential edge of table 20 through each of the square holes 22-1 thru 22-16 and area 58. These paths may be either openings fabricated in table 20 or fiber-optic devices implanted in table 20.

Sample table 20 further has associated therewith seventeen photosensitive detectors 64-1 thru 64-17. Each of the photosensitive detectors 64-1 thru 64-17 is placed on the circumferential edge of table 20 in alignment with the optical path 62-1 thru 62-17 and the square holes 22-1 thru 22-16 and area 58. In this manner, light from Xenon lamp 60 travels through the paths 62-1 thru 62-17, the square holes 22-1 thru 22-16 (and contents thereof, if any) and area 58 to the associated photosensitive detectors 64-1 thru 64-17. Each of the photosensitive detectors 64-1 thru 64-17 provides an analog signal which is proportional to the color transmittance measured in the flow path of the light. Also, appropriate focusing and color filtering elements are included in the photosensitive detectors 64-1 thru 64-17.

Each of the detectors 64-1 thru 64-17 also provides a tube inserted signal whenever a tube is inserted in a corresponding one of the holes 22-1 thru 22-16. Thus, each of the detectors 64-1 thru 64-16 provides two signals.

The heart of automatic chemical testing apparatus 10 is the control logic and storage circuit 66. Circuit 66 may be a programmable general purpose digital microcomputer, such as the Intel 8008 integrated circuit and associated storage facilities such as a random access memory (RAM) and a read-only memory (ROM). For flexibility, it may be found desirable to use a programmable read-only (PROM) in place of all, or a portion of, the read-only memories. Using a PROM allows an easy manner of changing the tests of the dedicated channels, as it is necessary to adjust the reading time or times whenever the test of a particular dedicated channel is changed. The RAM may be used for storing temporary values, such as test result values or the scaling factor, and accordingly is relatively small. The ROM may contain the set of computer instructions used to effect the function of circuit 66.

Circuit 66 includes input/output circuitry of any known type, and is responsive to the signals appearing on an input bus 58, which signals are applied thereto thru appropriate interface circuitry of a known type associated with each of a plurality of different input circuits coupled thereto. Circuit 66 provides signals thru the input/output circuitry thereof to an output bus 70, which in turn couples the signals to appropriate interface circuitry associated with various output circuits. The various input circuit coupled to circuit 66 through input bus 68 include Multiplexer, Log Amplifier, and Analog-to-Digital converter circuit 72, and Tubes Inserted Logic 74. Circuit 72 is responsive to each of the analog signals from detector 64-1 through 64-17, and upon command from circuit 66 via a signal applied through output bus 70, circuit 72 finds the logarithm value of the values provided from a determined one of the detectors 64-1 thru 64-16, divided by the value provided from detector 64-17. This logarithm value is then converted to a digital value and applied through input bus 68 to circuit 66. Tubes Inserted Logic 74 is responsive to each of the tubes inserted signals provided from detector 64-1 thru 64-16, which indicate whether a tube is present in the corresponding holes 22-1 thru 22-16, and provided a signal through input bus 68 to circuit 66 indicating which, if any, of the tubes are inserted. The input circuits further include Blank button circuit 76, Reference button circuit 82 and Temperature button circuit 84. These circuits provide signals indicating that the depression of a respective one of the Blank, Reference, Operate, Print and Temperature buttons 46, 48, 50, 52 and 56. Also coupled to input but 68 are timer switch 186 and timer switch 288, which provide signals manifesting the times set on timers 40 and 42. Other circuits providing signals to input bus 68 are Temperature circuit 90, which provides a signal manifesting the temperature of table 20, and Assay Card Reader circuit 92, which on command of a signal from output bus 70, provides signals manifesting the information read from a particular channel from the assay card inserted in slot 14. Further, the input circuits include Channel Interrupt circuit 94, which responds to the tubes inserted signals from the detectors 64-1 thru 64-16 to provide an interrupt signal whenever a tube is inserted in one of the holes 22-1 thru 22-16. This interrupt signal identifies which of the holes 22-1 thru 22-16 has just had the tube inserted therein. In practice Channel Interrupt circuit 94 and Tubes Inserted Logic 74 may be combined into a single circuit, but are shown herein separately for clarity. The last input circuit is Channel Button circuit 96 which provides a signal manifesting which, if any, Channel Button 28 has been depressed.

Output circuits responsive to signals applied from circuit 66 to output bus 70 include the Clock Display circuit 98, which may be turned on in response to the first tube being inserted in one of the holes 22-1 thru 22-16, or which may be set to a specific number and counted towards zero in response to a tube being inserted in one of the holes 22-1 thru 22-16 if the count thereon at the time of the insertion is less than the time required to complete the test for the tube inserted in that particular hole. Further, the output circuits included Channel Lights circuit 100 and Channel Flash Latches circuit 102. Channel Light circuit 100 responds to signals on output bus 70 by turning on an appropriate one of the lights beneath one of the channel buttons 28. Channel Flash Latches circuit 102 respond to the signals on output bus 70 by causing a particular one of the lights beneath one of the channel buttons 28 to begin flashing. Circuits 100 and 102 could be combined into a single curcuit, but are shown separately herein for clarity. Other output circuits include Display circuit 104 and Printer circuit 106, which respond to appropriate display signals and print signals appearing on output bus 70 to either display the results of a particular test or the temperature, as the case may be, on display 34 or to print the results of a particular test or tests on the card inserted in slot 16. Another output circuit is the Message Lights and Alarm circuit 108, which responds to signals on output bus 70 by illuminating a particular message on message display 38, and in appropriate cases, by sounding an audible alarm. Finally, the output circuits include Blank Lights circuit 110, Reference Light circuit 112, Operate Light circuit 114, Ready Light circuit 116, Print Light circuit 118 and Temperature Light circuit 120, which are respectively responsive to output bus 70 signals to turn on the lights beneath respective Blank, Reference, Operate, Ready, Print and Temperature buttons 44 through 56 (even numbers only). As previously noted signals appearing on output bus 70 may also be applied to Multiplexer, Log Amplifier and Analog-to-Digital convertor circuit 72, or to Assay Card Reader circuit 92.

The manner by which signals are coded and applied from each of the input circuits 72 to 96 (even numbers only) through input bus 68, and decoded by circuit 66, and the manner by which signals are applied from circuit 66 through output bus 70 and decoded by each of various output circuits 72, 92 and 98 through 120 (even numbers only) is well known. For instance, a signal may include, as the first four bits of a digital code, a unique code for only one of the circuits. In the case of the input circuits 72 through 96 (even numbers only) this code identifies the circuit providing the signal, and in the case of the output circuits 72, 92 and 98 through 120 (even numbers only), this code causes only that circuit to respond to the signal of the output bus 70. Additional digital coding after the first four bits may cause a particular circuit to respond to only a particular channel, such as for instance, the next four bits may cause circuit 100 to turn on a particular one of the sixteen channel lights or may cause Assay Card Reader 92 to read the values associated with only a particular channel.

The operation of apparatus 10 as shown in FIGS. 1 and 2 will be hereinafter described with particular reference being made to FIGS. 3 through 9 in which a flow diagram of the operation of each of the elements and circuits shown in FIGS. 1 and 2 will become apparent and an appropriate computer program for circuit 66 to perform these functions can easily be made. Further, in the event that circuit 66 is hard wire logic, appropriate logic can be designed to cause the following described functions to be performed.

Figure 3:
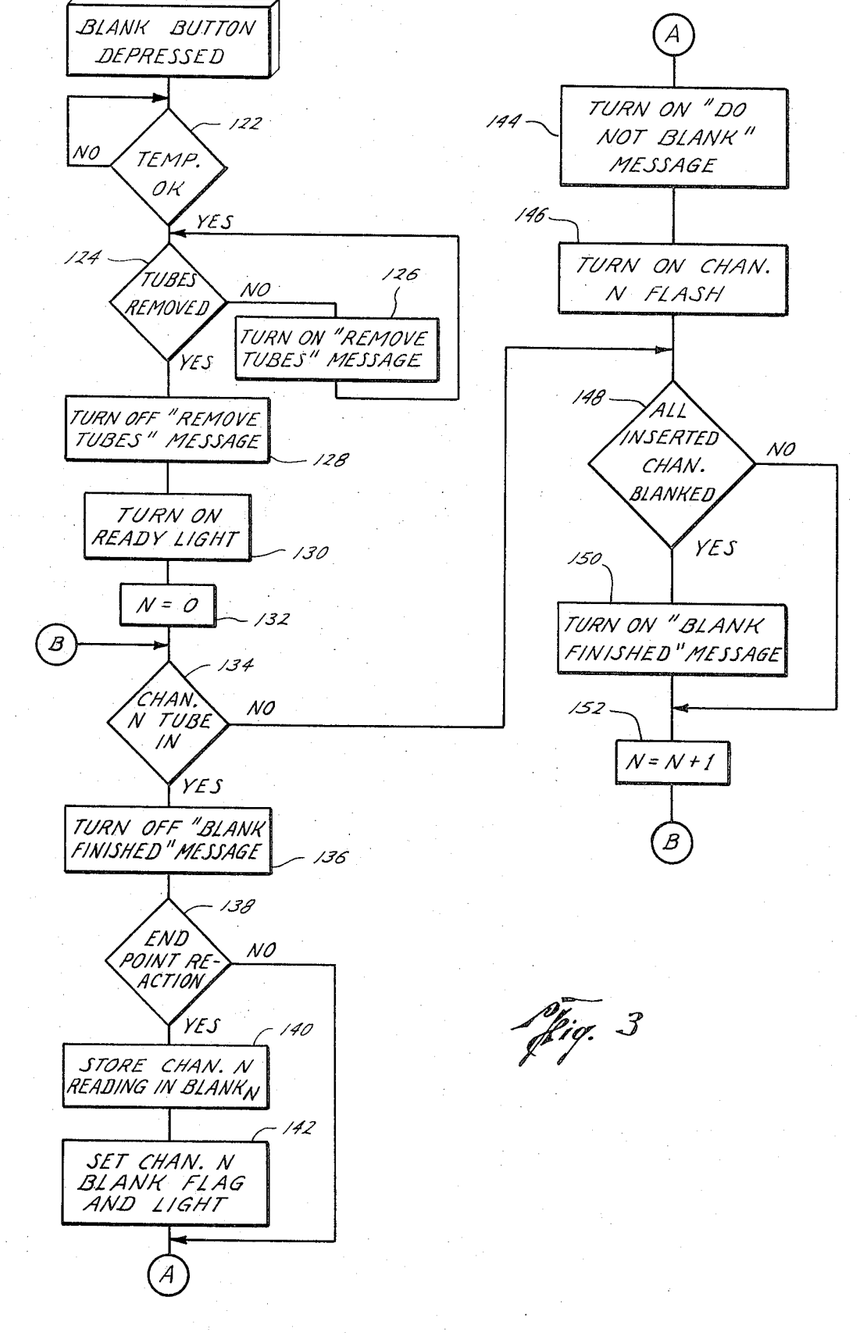
FIGS. 3 thru 9 constitute a flow diagram of the sequential operation of the apparatus shown in FIG. 2.

Referring to FIG. 3, after Power button 44 has been depressed and power applied to apparatus 10, the first thing to be done is to depress Blank button 46. FIG. 3 shows the sequence of events which follows the depression of Blank button 46. This sequence of events is represented by blocks 122 thru 152 (even numbers only) of FIG. 3. First, according to block 122 the temperature as manifested by the signal provided by temperature circuit 90 shown in FIG. 2, is checked. If the temperature is at the proper value which may be, for instance, 37 degrees centigrade, or body temperature, then a continuation to block 124 occurs. Otherwise, the temperature is continually monitored until it is at a proper value. According to block 124, a determination is made whether all of the tubes from each of the holes 22-1 thru 22-16 have been removed. This determination may be made by checking the signal provided from Tubes Inserted Logic 74, which, as previously mentioned, is responsive to the tube inserted signals provided from the detectors 64-1 thru 64-16. If all of the tube inserted signals from detector 64-1 thru 64-16 indicate that no tube is inserted in the corresponding one of the holes 22-1 thru 22-16, then the signal from Tubes Inserted Logic 74 thru input bus 68 to circuit 66 will so indicate. However, if for some reason one or more tubes has mistakenly been left in one of the holes 22-1 thru 22-16, then the signal provided from Tubes Inserted Logic 74 will indicate this to circuit 66. In this event, block 126 indicates that circuit 66 applies a signal through output bus 70 to Message Lights and Alarm circuit 108 to cause the Remove Tubes message on message display 38 to be turned on. Thereafter, the determination of whether the tubes have been removed is again performed as indicated by block 124. Once the tubes have been removed, or if none originally had been inserted, block 128 indicates that the Remove Tubes message is then turned off. If no tubes initially had been placed in one of the holes 22-1 thru 22-16 the turning off of the Remove Tubes message is, in effect, a meaningless operation.

At this point as indicated by block 130, a signal is provided from circuit 66 thru output bus 70 to Ready Light circuit 116 to illuminate the light beneath Ready button 54. This indicates that the system is now ready to be blanked. At this point, the operator will then proceed to place an empty tube in each of the holes 22-1 thru 22-16. The reason for this is to compensate for the transmittance due to the tube itself so that subsequent readings can manifest the contents of the tube only.

Next, an interval variable N is set equal to zero, as indicated by block 132. As used herein, the internal variable N refers to the channel number one greater than its value. Thus, when the variable N is equal to zero the operation thereafter referred to will be with respect to channel 1. Next as indicated by block 134, a test is made to determine whether a tube has been inserted into channel 1, or more specifically, hole 22-1, since N at this point equals zero. This may be done by causing Tubes Inserted Logic 74 to provide its signal thru input bus 68 to circuit 66. If for some reason channel 1 is not desired to be blank and the indication from block 134 is that no tube is inserted in channel 1, a jump to block 148 occurs. However, assuming channel 1 is to be blanked, then, continuing with block 136, the Blank Finished message on message display 38 is caused to be turned off, if it previously has been on. This occurs as a result of an appropriate signal being applied from circuit 66 thru output bus 70 to Message Lights and Alarms circuit 108.

Then according to block 138, the determination is made whether channel 1 is an end-point reaction channel or a dual-reading reaction channel. An end-point reaction channel means that only one reading of the color transmittance from that channel is made at an appropriate time after the tube has been inserted. In a dual-reading reaction channel, a first reading is made a fixed time after the tube has been inserted and a second reading is made a fixed longer time after the tube has been inserted. Then, the difference between the two readings is calculated and this value is used in calculating the desired result. Since the difference calculation in a dual-reading reaction cancels any error due to the tube transmittance, it is not necessary to blank these channels. Thus, if the result of the test at block 138 is that channel 1 is a dual-reading reaction, then blocks 140 and 142 are skipped. However, if channel 1 is an end-point reaction, then continuing with block 140 the value read from channel 1 is stored in the channel 1 BLANK location of the RAM storage area associated with circuit 66. Then, block 142 indicates that the channel 1 blank flag which may also be in the RAM storage area of circuit 66 is set and the light beneath the channel 1 channel button 28 is turned on. The channel 1 light may be turned on by causing an appropriate signal to be applied from circuit 66 through output bus 70 to Channel Light circuit 100.

Continuing with block 144, the message "Do Not Blank" is then turned on. Then according to block 146 the light beneath channel 1 is caused to flash. The message may be caused by an appropriate signal from circuit 66 thru output bus 70 to circuit 108 and the flashing light beneath channel 1 may be caused by an appropriate signal applied from circuit 66 thru output bus 70 to the appropriate channel flash latch in circuit 102.

Next, according to block 148, a test is made to determine whether all channels which have tubes inserted therein have been blanked. If other channels still require blanking, block 150 is skipped and block 152 indicates that the value of N is incremented by one and a return to block 134 occurs and the above described blanking operation is repeated for the next channel. Once all of the channels have been blanked, block 150 indicates that the Blank Finished message on message display 38 is turned on.

After the Blank Finished message comes on, the next step in preparing apparatus 10 to perform tests on unknown samples is the Reference operation. To do this, tests are performed on a control serum which has known amounts of the various substances being tested. As previously mentioned, these values are recorded on the assay card which is inserted into slot 14 and read by the assayed reader assembly (not shown). The transmittance values obtained from performing tests using the control serum can then be compared with the known values read from the assay card to obtain a scaling factor used to convert the transmittance values to concentration units. In this manner the system is calibrated automatically. To perform the reference mode of operation, the operator first removes all of the tubes from table 20, places the assay card in slot 14 and then depresses Reference button 48. Then, the operator places tubes containing the proper control serum-reagent mixtures in each of the channels being referenced, which may be those channels in which an end-point reaction is performed. After this has been done, apparatus 10 is automatically calibrated.

Figure 4:
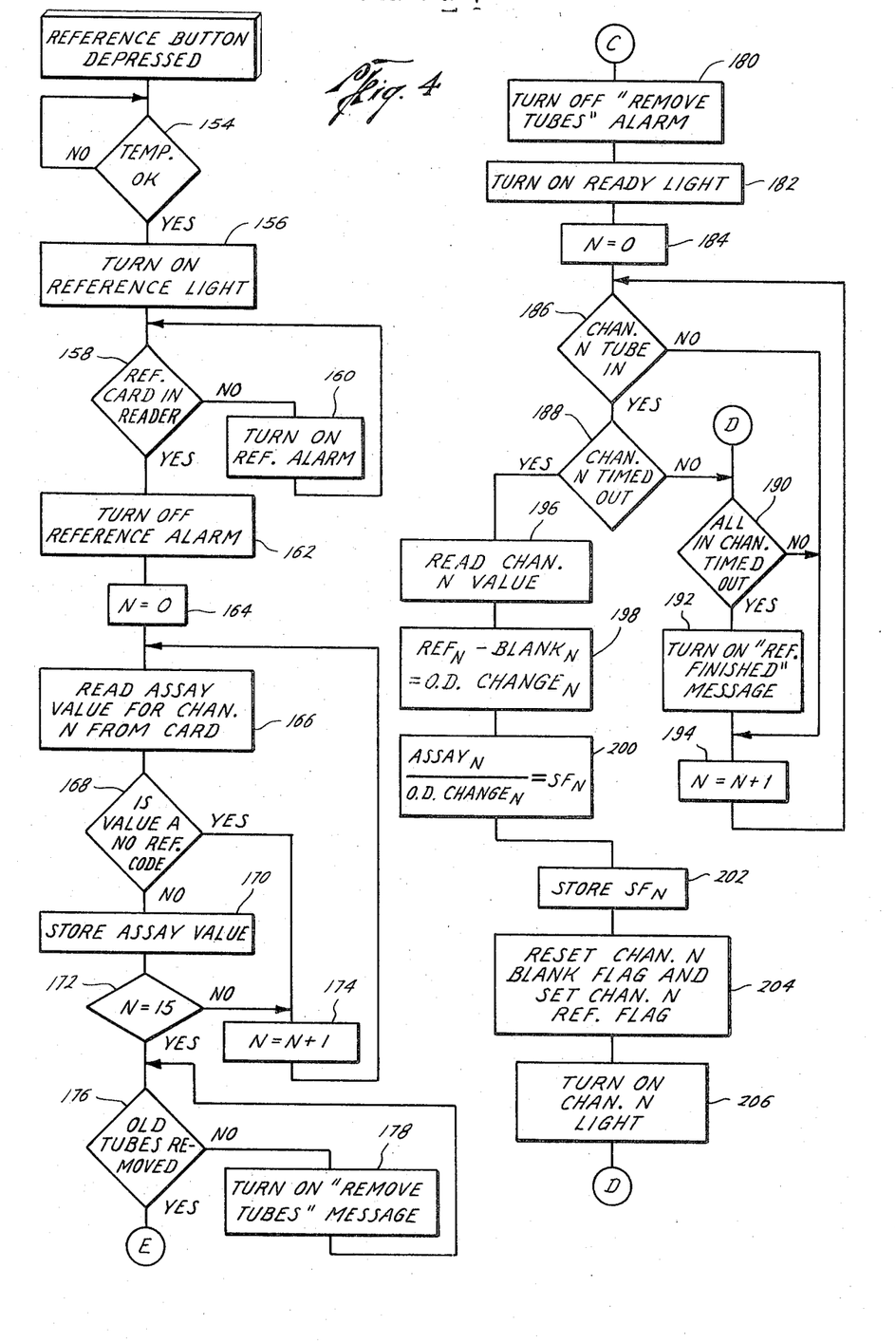

Referring now to FIG. 4, the sequence of events performed during the Reference mode of operation will now be described with specific reference being made to blocks 154 thru 206 (even numbers only). First, according to block 154, the temperature of table 20 is checked. As previously mentioned, this is done by checking the signal provided by circuit 90. If the temperature is improper, a wait until the proper temperature is present occurs. Then, according to block 156, the light beneath Reference button 52 is turned on. This is done by sending the appropriate signal to Reference Light circuit 112.

Next, according to block 158, a determination is then made of whether the assay card has been placed in slot 14. In the event the card has not been placed in slot 14, the Reference alarm is turned on as indicated by block 160. The Reference alarm may be an audible alarm, a visual message on message display 38, or both. This is done by sending the appropriate signal to circuit 108. The block 158 test is again repeated until such time as the assay card has been inserted in block 14. The test in block 158 can be made by checking the signal provided from Assay Card Reader circuit 92. This signal may simply be either a high voltage or low voltage (one-bit or zero-bit) indicating that the card is present. At other times the signal will be a digital word of an appropriate number of bits manifesting particular values which are read from the assay card and transmitted by Assay Card Reader circuit 92. Once the assay card has been inserted into slot 14, block 162 indicates that the Reference alarm is then turned off. If the assay card initially had been in slot 114, the Reference alarm would never have been turned on, so the turning off of the Reference alarm, as indicated in block 162, would be a meaningless operation.

Next, as indicated by block 164 the internal value N is set equal to zero to indicate an operation to be performed on channel 1, as previously explained. Then, according to block 166, the assay values for channel 1 are read from the assay card inserted in slot 14 and applied by Assay Card Reader circuit 92 thru input bus 68 to circuit 66. The assay values are read by circuit 66 applying an appropriate signal thru output bus 70 to Assay Card Reader circuit. The signal would identify the proper channel number for which the assay value is to be read. Assay Card Reader circuit 92 would respond to the signal applied thereto by reading the assay value from the identified channel and apply a signal manifesting that assay value to input bus 68. Certain of the channels, such as the variable channel, do not require referencing; thus, block 168 makes a determination as to whether this particular channel must be referenced. If it need not be referenced, a continuation with block 174 occurs. However, assuming that the channel needs to be referenced, then block 170 indicated that the code applied thru input bus 68 to circuit 68 from Assay Card Reader circuit 92 is stored in the RAM storage portion of circuit 66 for later use. Next, according to block 172, a test is made to determine whether N is equal to fifteen or not. If N is less than fifteen, then block 174 indicates that N is incremented by one and a return to block 166 occurs. This sequence of events continues with the assay values for each of the dedicated channels being read and stored in the RAM storage area of circuit 66.

When the determination of block 172 is that N equals fifteen, a continuation with block 176 occurs. Here, a test is made to assure that all of the old tubes have been removed. This test, as previously mentioned, is performed by Tube Insertion Logic 74 checking each of the sixteen insert outputs from detectors 64-1 thru 64-16 applied thereto to determine whether any tubes are inserted. If one or more tubes are inserted, block 178 indicates that the Removed Tubes message on message display 38 is turned on in the manner previously described and the test at block 176 is repeated until such time as no tubes are inserted in one of the holes 22-1 thru 22-16.

Once the determination made at block 176 indicates that all of the old tubes have been removed, block 180 indicates that the Removed Tubes message is turned off. Then block 182 indicates that the Ready light is turned on. At this point, the operator inserts the prepared tubes containing the proper control serum-reagent mixture into the end-point reaction ones of dedicated channels 1 thru 15. Then, block 184 indicates that the internal variable N is again set to zero and block 186 indicates that a test is made of whether a tube has been inserted in channel manifested by N, in this case channel 1. If no tube has been inserted in channel 1, then that channel will not be referenced and, as will subsequently be explained, the channel 1 reference flag will not be set. Also, as will be hereinafter explained, no results will be obtained from channel 1 during the operate mode until such time as channel 1 is properly referenced if channel 1 is an end-point reaction test channel. In the case where channel 1 is a dual-reading reaction channel, the reference flag will be permanently set in the memory associated with circuit 66. If no tube has been inserted in channel 1 then after the test at block 186, a continuation with block 194 occurs.

Assuming the determination made at block 186 indicates that a tube is inserted in channel 1, then block 188 indicates that a determination is made of whether channel 1 is then timed out, that is, whether the time between tube insertion and readout for channel 1 has elasped. Since the test made at channel 1 is a predetermined test, the time at which the reading or readings are to be made, is known and can be stored in the PROM storage area of circuit 66. A simple comparison of the time which has elapsed since the tube was inserted in channel 1 and the stored time can be made to determine whether channel 1 is then timed out. Assuming that channel 1 is not then timed out, that is, it either has yet to be timed out, or it previously had been timed out, then continuing with block 190 a determination is made of whether all of the channels have been timed out. If at block 190, it is determined that all of the channels have not been timed out, then a continuation at block 194 occurs. However, assuming that for the time being that all of the tests have timed out, then block 192 indicates that the Reference Finished message is caused to be turned on. As previously explained, this is caused by an appropriate signal being applied from circuit 66 through output bus 70 to Message Lights and Alarms circuit 108. Then a continuation at block 194 occurs with N being incremented to the next value and a return to block 186 occurs, where a determination is made of whether a tube is inserted in the next higher numbered channel and the above described sequence of events occurs for that next higher channel. At block 194, when N equals fifteen, it is incremented to zero rather than sixteen.

If the determination made at block 188 was that channel N had then timed out, then a continuation to block 196 occurs, where it is indicated that the transmittance value for channel N is read. This occurs by circuit 66 applying a signal through output bus 70 to Multiplexer, Log Amplifier and Analog-to-Digital Converter circuit 72 to indicate that it is to read the results applied thereto from channel N. If channel N is channel 1, then the transmittance values read by detector 64-1, which is continuously being applied to the multiplexer portion of circuit 72, is applied to the logarithmic amplifier portion of circuit 72. Also, the output from detector 64-17 is applied to the logarithmic amplifier, and the logarithm of the transmittance value applied from detector 64-17 is determined. Then, this value is converted from an analog value to a digital value and applied thru input bus 68 to circuit 66 as the reference value ($REF_N$).

Next, as indicated at block 198 the difference between the reference value for channel N applied from circuit 72 and the value previously stored at the BLANK location for channel N is found. This difference is equal to the optical density difference for channel (O.D. $CHANGE_N$). Then, as indicated at block 200, the ratio of the assay value read from the assay card inserted in slot 14 for channel N ($ASSAY_N$) to the optical density change for channel N is determined; this is called the scaling factor for channel N ($S.F._N$) which, as indicated at block 202, is stored at location $S.F._N$. Then, as indicated at block 204, the channel N blank flag is reset and the channel N reference flag is set, and, as indicated at block 206, the light beneath the channel N channel button 28 is turned on. This indicates to the operator that channel N has now been referenced. Thereafter, a return to block 190 occurs and the above procedure is repeated until such time as all channels being referenced have been timed out and the scaling factor therefor determined. Then, as indicated by block 192, the Reference Finished message is turned on.

Figure 5:
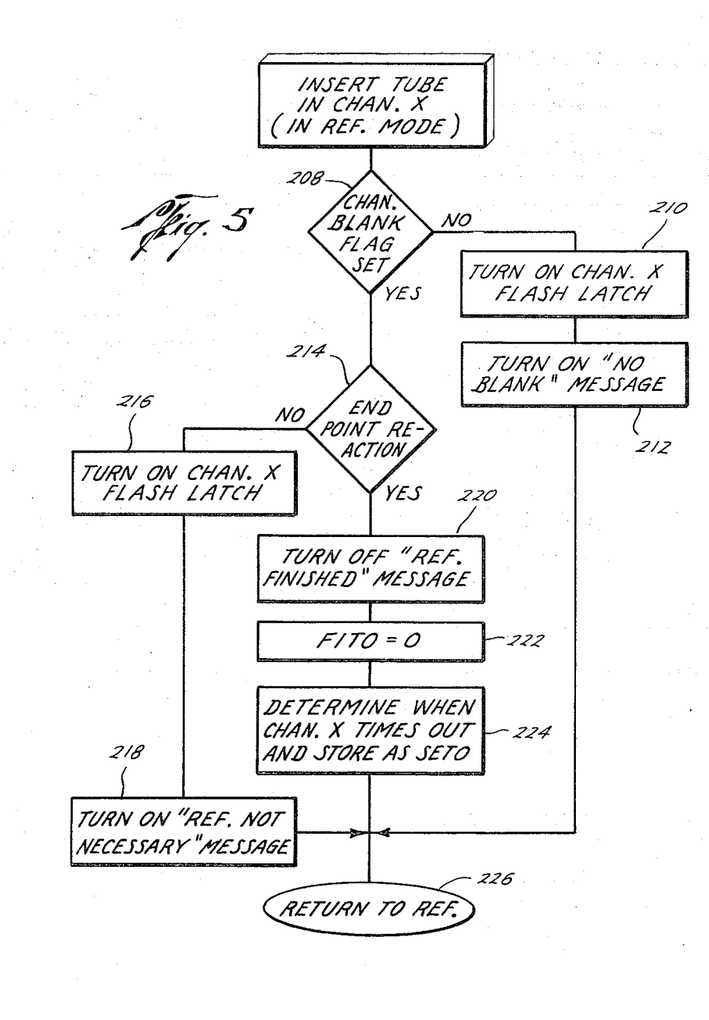

Up to this point, in discussing the reference operation shown by FIG. 3, no mention has been made of the sequence of events which occur when a tube is inserted. When a tube is inserted into a hole 22, the insert signal applied from the proper one of the detectors 64-1 thru 64-16 to channel interrupt circuit 94 causes an interrupt signal to be applied thru input bus 68 to circuit 66. Circuit 66 processes the interrupt signal applied thereto in the manner shown in FIG. 5. FIG. 5 includes blocks 208 thru 226 (even numbers only). The interrupt signal applied through input bus 68 to circuit 66 not only identifies itself as an interrupt signal, but also identifies the channel in which the tube had been inserted. As used in FIG. 5, this channel will be referred to as channel X. It should be understood that each time a tube is inserted in one of the channels during the reference mode, the channel interrupt operation shown by FIG. 5 occurs. This occurs by having an immediate branch from the main reference processing sequence, shown by FIG. 4 to the reference interrupt sequence shown by FIG. 5. After the processing in FIG. 5 has been completed for channel X, a branch back to the point branched from in FIG. 4 occurs, and the processing in FIG. 4 continues, from that point.

Referring now specifically to FIG. 5, block 208 indicates that a determination is made whether the blank flag for channel X has been set. It should be recalled that this flag was set during the blanking operation, as explained in FIG. 3. If the blank flag for channel X had not been set, then, according to block 210, the channel X flash latch is set which causes the light beneath the channel X channel button 28 to flash. Then according to block 212 a signal is applied from circuit 66 thru output bus 70 to the Message Lights and Alarms circuit 108 to cause the No-Blank message on message display 38 to be turned on. At this point, a return to the branched from point in the main reference processing sequence shown in FIG. 4 occurs, as indicated by block 226. The situation will persist with the channel X button 28 flashing and the No Blank message being displayed, until such time as the operator has blanked channel X in the manner previously discussed with respect to FIG. 3. To do this, it will be necessary for the operator to remove the tubes and press Blank button 46. Then he may reference channel X in the manner as previously described.

If it was determined at block 208 that the blank flag for channel X had been set, as should normally be the case, then according to block 214 a determination is made of whether the test performed in channel X is an end-point reaction or a dual-reading reaction. If the channel X test is not an end-point reaction, that is, if it is a dual-reading reaction, then according to block 216, the channel X flash latch is turned on which causes the channel X channel button 28 to begin flashing, and according to block 218, the message Reference Not Necessary is displayed on message display 38. Then a return to the reference sequence shown in FIG. 4 occurs as indicated by block 226. The channel X channel button 28 will continue flashing and the Reference Not Necessary message will continue to be on until the tube is removed from channel X.

If at block 214, it had been determined that channel X was an end-point reaction, then according to block 220, the Reference Finished message is turned off. It should be recalled that this message was turned on during the sequence of operations shown in FIG. 4 at block 192. Then, according to block 222 the first time out location for channel X is set equal to zero and according to block 224 a determination is made as to when channel X times out and this time is stored in the second time out location for channel X. Then, a return to the reference sequence of FIG. 4 occurs, as indicated by block 226.

Once all the channels have been referenced in the manners described with respect to FIGS. 4 and 5, apparatus 10 is then able to perform the determinations for unknown substances in the blood serum. This may be done by first depressing Operate button 50, waiting for the light beneath Ready button 54 to turn on, and then inserting prepared serum-reagent tubes into the desired holes 22. If it is only desired to run specific tests, then tubes need only be placed in the channels dedicated to those tests, or in other words, the manner of programming apparatus 10 is by inserting the tube in the desired channel. If no tube is inserted, no test is performed; if a tube is inserted, a test is performed. As previously mentioned, channels 1 thru 15 are dedicated channels and channel 16 is a variable channel. Each of the dedicated channels will perform a specific test and the reading time or times for those channels are stored in the PROM memory of circuit 66. Alternately, these values may be stored on and read from the assay card, which is inserted into slot 14.

In the case of the variable channel, it is necessary to set the first and, if necessary, second readout times by rotating buttons 40 and 42. The time set on button 40 will determine the time that the first readout is made and the time set on button 42 will determine the time the second readout, if any, is made. These values are applied from Timer 1 and 2 circuits 86 and 88 in FIG. 2 thru input bus 68 to circuit 66 and stored in the RAM storage locations thereof as the first time out and second time out values.

Figure 6:
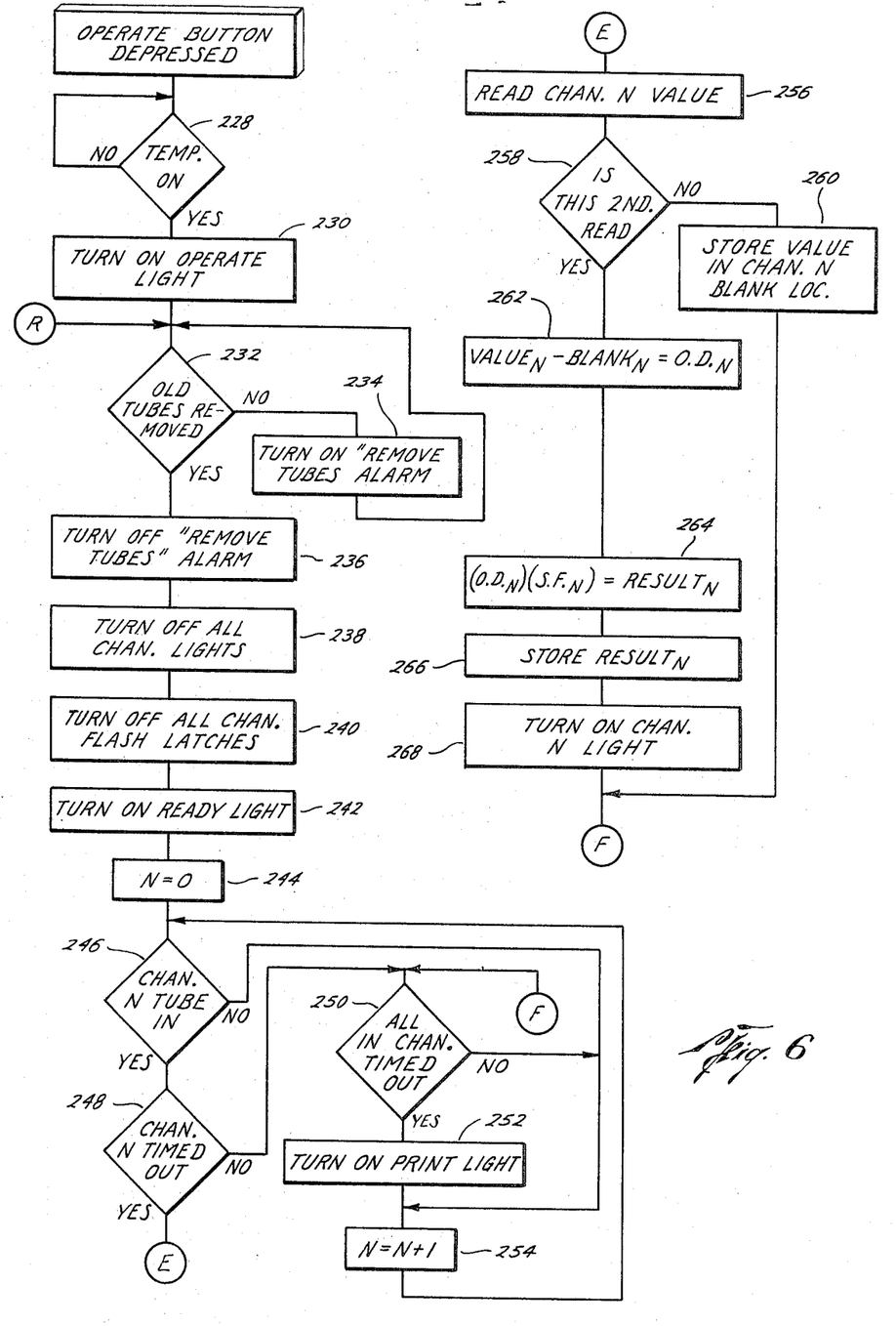
Figures 7, 8:
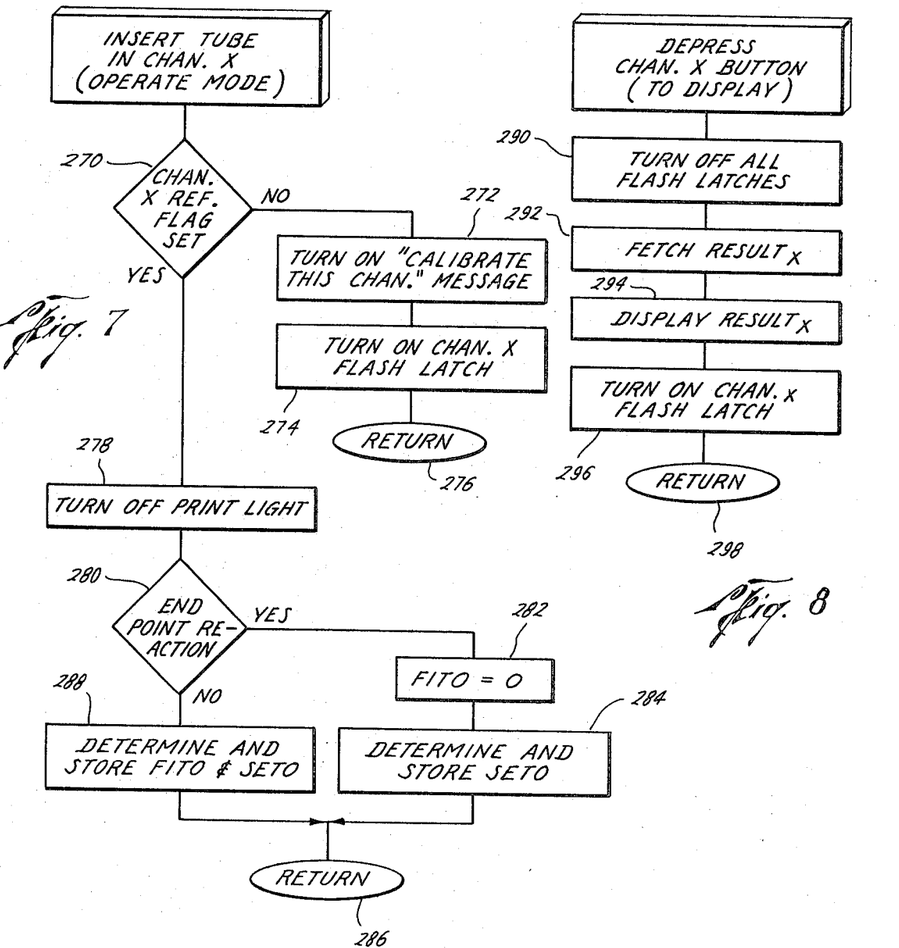
Figure 9:
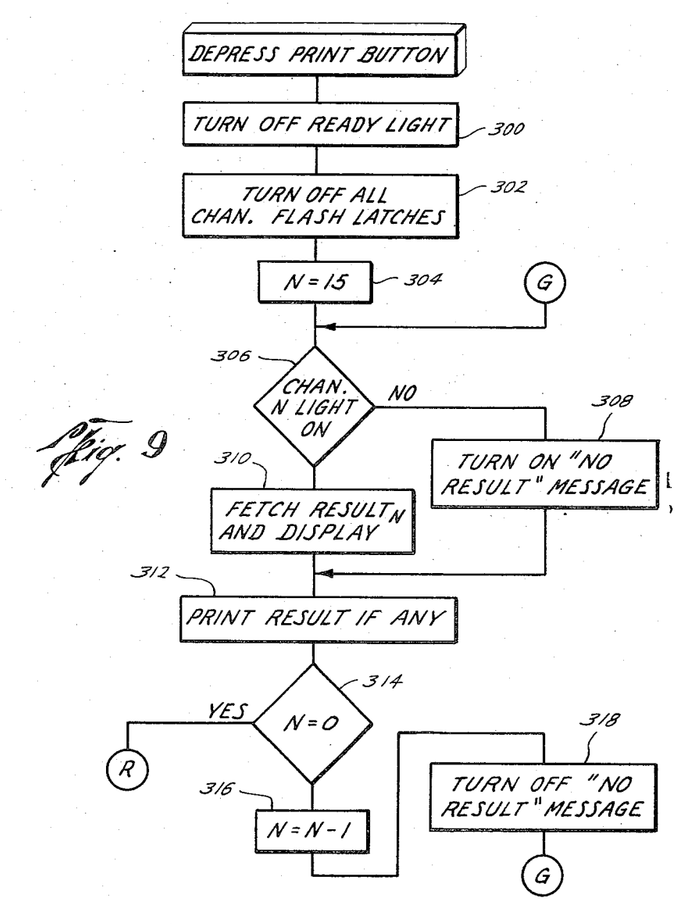

When the Operate button 50 is depressed, the sequence of events shown in FIGS. 6, 7, 8 and 9 occur, ultimately resulting in printing the results of the test on the card inserted in slot 16. FIG. 6 consists of blocks 228 thru 268 and represents the main sequence of events occurring during the operate mode. FIG. 7 includes blocks 270 thru 288 and indicates the interrupt procedure during the operate mode when a tube is inserted in one of the channels. FIG. 8 includes blocks 290 thru 298 and includes the interrupt procedure when one of the channel buttons 28 is depressed to cause the test results of that channel to be displayed on display 34. FIG. 9 includes blocks 300 thru 318 and represents an interrupt procedure when Print button 52 is depressed.

Referring now to the main sequence of the operate mode, shown in FIG. 6, the first thing which occurs, as indicated by block 228, is that the temperature of table 20 is checked. If the temperature is improper, it is continually rechecked and monitored until such time as it has arrived at the proper value. This is done by monitoring the signal provided by circuit 90. Assuming that the temperature is proper, then, according to block 230, the light beneath Operate button 50 is turned on to indicate the operate mode.

Block 232 then indicates that a determination is made of whether all of the old tubes have been removed. If this is not the case, then, as indicated by block 234, the Removed Tubes message and alarm is turned on and this condition remains until such time as the determination at block 232 indicates that all of the old tubes have been removed. Then, according to block 236, the Removed tubes message and alarm is then turned off. Further, as indicated by block 238, all of the channel lights are turned off and, as indicated by block 240, all of the channel flash latches are turned off, or reset. Then, as indicated by block 242 the light beneath Ready button 54 is turned on. The illuminated Ready button 54 indicates to the operator that tubes may now be inserted into the desired channels for which tests are to be run, and, in the case of a variable test, the tube inserted into the variable channel and the times associated with a particular variable test set.

Next, according to block 244 the internal variable N is set equal to zero, and according to block 246, a determination of whether a tube is inserted in the channel N location is made. It should be recalled that with N equal to zero, the channel N location is channel 1. If no tube has been inserted in the channel, a continuation with block 254 results and the value of N is incremented, as indicated by block 254, and a branch back in block 246 occurs. With respect to block 254, it should be noted, that once the value of N reaches fifteen, then it is reset to zero rather than being incremented to sixteen because there are only sixteen channels to be tested.

If the determination at block 246 indicated that a tube is in the channel N location then according to block 248 a determination is made of whether channel N is then timed out, or in other words, whether it is timed to read the results from channel N. If channel N is not then timed out, then, according to block 250, a further determination is made as to whether all of the channels have previously been timed out. If this is not the case then continuation with block 254, as previously explained, occurs. However, if all of the channels have been timed out, then according to block 252, the Print light beneath Print button 52 is turned on. This indicates to the operator that all of the programmed tests have been performed and it is time to depress Print button 52 to cause the results thereof to be printed on the card inserted in slot 16. Thereafter, the print interrupt sequence of events shown in FIG. 9 occurs, and this will be explained in more detail hereinafter.

If the determination made at block 248 is that channel N is then timed out, then a continuation at block 256 results. Block 256 indicates that the transmittance value of channel N is caused to be read. As previously explained, this is done by circuit 72 providing a signal manifesting the logarithm of the transmittance value from the channel N detector 64 divided by the transmittance value from detector 64-17. Then, block 258 indicates that a determination is made of whether this is the the second reading. In the case of an end-point reaction, this determination will always be positive. If this is the first reading of a dual-reading reaction then block 260 indicates that the value just read is stored in the BLANK location of the RAM for channel N. If at block 258 it had been determined that this was the second time that channel N had been read, or if the test of channel N is an end-point reaction, then block 262 indicates that the calculation of the value of this reading minus the value stored in the BLANK location for channel N is determined and this is stored in the optical density location for channel N ($O.D._N$). Then, according to block 264, the optical density for channel N is multiplied by the scaling factor for channel N to determine the test result and this is stored in the RESULT location for channel N, as indicated at block 266. It should be recalled that the scaling factor was previously calculated and stored during the reference mode of operation at blocks 200 and 202 in FIG. 4. Next, according to block 268, the light beneath the channel N channel button 28 is turned on.

At this point a return to block 250 occurs and the determination is made of whether a time out has occured for all channels in which a tube has been inserted. Thereafter, the previously described sequence of events continues.

Referring now to FIG. 7, the tube interrupt sequence of events when a tube is initially inserted in one of the channels referred to as channel X is shown. As previously mentioned with respect to FIG. 5, when a tube is inserted in a channel, an interrupt signal is provided identifying that channel. During the operate mode, the main operate sequence, shown in FIG. 6, is continually occurring. However, when the tube is inserted, this sequence is interrupted and the sequence shown in FIG. 7 occurs. When the FIG. 7 sequence is completed a return to the point interrupted in FIG. 6 occurs.

First, as indicated by block 270 in FIG. 7, a determination is made whether the channel X reference flag is set. It should be recalled that this flag was set in at block 204 in FIG. 4 after channel X had been properly referenced or is stored as set if channel X is a dual-reading reaction channel. If for some reason the reference flag for channel X is not set, thereby indicating that channel X needs to be referenced, then according to block 272 the "Calibrate This Channel" message on message display 38 is turned on and the channel X flash latch is set to cause the light beneath the channel button 28 for channel X to begin flashing. Then, as indicated by block 276, a return to the operate mode sequence of events in FIG. 6 occurs. The flashing channel button and message will be turned off when the tube is removed from channel X. However, before any test can be performed on channel X, it will be necessary to first reference that channel as explained with respect to FIGS. 4 and 5.

Assuming that the channel X reference flag is set, then a continuation from block 270 to block 278 occurs. Block 278 indicates that the light beneath Print button 52 is turned off, if it had previously been turned on. Then, according to block 280, a determination is made of whether the test performed in channel X is an end-point reaction or a dual-reading reaction test. If it is determined that channel X is an end-point reaction, then according to block 282, the first time out storage location is set equal to zero and according to block 284 the second time out time is determined and stored at the second time out storage location in the RAM memory. Then, as indicated by block 286, a return to the main operate mode sequence shown in FIG. 6 occurs. If at block 280 it had been determined that dual-reading reaction test is performed in channel X, then, according to block 288, the first and second time out readings are both determined and stored respectively at the first time out and second time out storage locations in the RAM memory and, then according to block 286, a return to the main operate mode program occurs.

It should be recalled that in FIG. 6 at block 268, the channel light was turned on beneath the channel button 28 relating to the channel for which the results had been determined. However, these results are not printed until after all of the tests results are obtained.

If it is desired to know the results of the test immediately, rather than waiting for the remaining tests to be completed, the operator need only to press the illuminated channel button 28 to cause the results to be displayed on display 34. The sequence of events following the depression of an illuminated channel button 28 is shown in FIG. 8. It should be noted that FIG. 8 is another interrupt sequence which interrupts the main operational sequence of events shown in FIG. 6.

According to block 290 in FIG. 8 the first thing which occurs after the depression of illuminated channel X channel button 28 is that all of the flash latches are turned off. This causes any channel button 28 which previously had been flashing to cease flashing. However, all illuminated channel buttons 28 remain illuminated. Then, according to block 292 the result for channel X is then retrieved from the RAM storage area of circuit 66. Then, according to block 294, the channel X result is transmitted thru output bus 70 to the display circuit 104, to cause the results manifested thereby to be displayed on display 34. Finally, according to block 296 the channel X flash latch is then turned on which causes the light beneath channel X channel button 28 to begin flashing. This indicates that the number displayed on display 34 is the value for the channel button 28 which is flashing. Thereafter, as indicated by block 298, a return to the branched from point of the main operational sequence shown in FIG. 6 occurs.

After all of the programmed channels have been timed out, the light beneath Print button 52 turns on as previously explained with respect to block 252 in FIG. 6. This indicates to the operator that all of the tests are finished and that it is now time to print the results on the card inserted in slot 16. This is accomplished by depressing Print button 52, which again causes the main operate mode sequence shown in FIG. 6 to be interrupted and the sequence shown in FIG. 9 to be performed.

According to block 300, the light beneath Ready button 54 is turned off. Then, according to block 302 all of the channel flash latches are turned off, thereby causing any channel button 28, which had been flashing to cease flashing. Then, according to block 304, the internal variable N is set to equal fifteen. It should be recalled that this refers to channel 16. At this point, a determination is made, as indicated by block 306, of whether the light for channel N is on. If the light is on, then the test for channel N has been performed. If it is off, then no test had been performed for channel N. In the event that the light is off, then block 308 indicates that the No Result message is shown on message display 38 and a continuation with block 312 occurs.

If, the determination made in block 306 is that the channel N light is on, then according to block 310 the result for channel N is retrieved from the RAM storage area of circuit 66 and displayed on display 34 in a manner described above with respect to FIG. 8. Then, continuing with block 312, the result if any, is printed on the card inserted in slot 16. This may be accomplished by sending a proper signal from circuit 66 through output bus 70 to printer circuit 106 shown in FIG. 2. In the event that a result is to be printed, the signal will include values manifesting the numerical results followed by a function signal causing the printer apparatus to move the print-out card to allow the next line to be printed. In the event no test has been made on channel N, then only the function signal causing the card to be moved is sent.

Next, according to block 314, a test is made to determine whether or not N is equal to zero. If N is not equal to zero then according to block 316, N is decremented by one and according to block 318 the No Result message is turned off, if it had been previously turned on, and a continuation at block 306 occurs. The same print sequence is thereafter performed for the decremented value of N in the manner previously described.

If at block 314, it had been determined that N is equal to zero, thereby indicating all results have been printed, the card is caused to be ejected from printer slot 16. Thereafter, a continuation at block 232 in FIG. 6 occurs. In this case, the Remove Tubes message will be turned on, assuming of course that all of the tubes had not been removed prior to the pressing of the Print button 32. Once all of the old tubes are removed, the light beneath Ready button 54 is turned on and then new tubes may be inserted and a new analysis performed in the manner previously described. It should be noted that at the end of the print interrupt sequence shown in FIG. 9 the return is not to the branched from point of the operate mode main sequence, but rather to block 232 thereof.

What is claimed is:

1. Automatic chemical testing apparatus for detecting the amount of at least one of a plurality of given chemical substances in a liquid sample, wherein for each given substance to be detected a portion of said sample is mixed with predetermined chemical reagents in a reaction vessel, whereby said mixture undergoes a detectable change in proportion to the amount of that given substance present in said sample, said change being measurable by detecting the energy passing therethrough, said apparatus comprising:

a plurality of vessel holding chambers, each chamber including means for sensing the insertion therein of a reaction vessel and providing a presence signal indicating the insertion in a chamber of a vessel, each chamber having energy associated therewith and means for providing an energy path for said energy to and through each of said plurality of chambers, each vessel being inserted in a chamber so that said energy is applied through the mixture in that vessel;

detector means associated with and positioned in juxtaposition with each chamber so that said energy applied to and through said chamber is applied to said detector means, said detector means providing a signal manifesting the energy applied thereto; and control means, responsive to the detector means signals provided from each detector means associated with those chambers having said presence signal provided therefrom, for processing each detector means signal at least one time, at a prescribed time or at prescribed times, after the vessel associated with that detector means was inserted in a chamber and for providing a signal manifesting the amount of each given substance being detected.

2. The invention according to claim 1 wherein said control means responds to each of selected detector means signal a given time after the vessel was inserted in the chamber with which that detector means is associated, said given time for each of said selected detector means being unique for that detector means; and wherein said control means responds to each remaining detector means signals at first and second times after the vessel was inserted in the chamber with which that detector means is associated, said first and second times for each of those remaining detector means being unique for that detector means.

3. The invention according to claim 2 wherein each of said chambers are included in vessel holding means which further includes vessel heating means to heat the contents of said vessel to a predetermined temperature.

4. The invention according to claim 3 wherein said energy includes visible and ultraviolet radiant energy.

5. The invention according to claim 4 wherein said energy is provided by a Xenon lamp located within said vessel holding means.

6. The invention according to claim 2
wherein said detectable change is a radiant energy absorbence change; and
wherein each of said detector means detect the amount of given radiant energy absorbence.

7. The invention according to claim 1
wherein each of selected ones of the vessel holding chambers are dedicated to detecting different specific substances;
wherein the reagent portion of the mixture in a vessel inserted in a chamber dedicated to detecting a specific substance has a reagent for that specific substance; and
wherein the time or times at which said control means responds to the detector means signal associated with each chamber is determined by the specific substance being detected in that chamber.

8. The invention according to claim 7
wherein at least one other one of said chambers is for detecting any one of a plurality of different substances;
wherein the reagent portion of the mixture in the vessel inserted in said other chamber is for the one substance being detected; and
wherein said apparatus further includes timer means for manually setting the time or times at which said control means is to respond to the detector means signal of the detector means associated with said one other chamber, the time or times set on said timer means being selected for the one substance then to be detected.

9. The invention according to claim 8
wherein the time at which said control means responds to each detector mean signal is measured independently for each vessel from the time a vessel is inserted in the chamber with which that detector means is associated; and
wherein the performance of desired specific substance detections is programmed by the insertion of a vessel in only those chambers dedicated to said substances.

10. Apparatus for detecting the amount of a selected number of predetermined chemical substances in blood serum comprising:
a reaction vessel for each selected substance being detected, each reaction vessel containing a mixture of a predetermined amount of said serum and at least one testing reagent, said reagent being selected for the substance being detected to cause a radiant energy absorbence change in that mixture, said radiant energy absorbence change being proportional to the amount of that substance;
a source of energy;
a reaction and detection table having a plurality of channels, selected ones of said channels being dedicated to the detection of specific substances and at least one of said channels being variable and not dedicated to any substance, said table including for each channel, a vessel holding and heating chamber for holding a reaction vessel and for maintaining the mixture in said vessel at a predetermined temperature, an energy path from said energy source through the mixture of any vessel inserted in the chamber of that channel, first detection means for providing a signal indicating the insertion of a vessel in said chamber and second detection means for providing a signal manifesting the transmittance due to the radiant energy absorbence of the mixture in the vessel inserted in the chamber of that channel;
manually settable timer means for providing timing signals; and
control means responsive to said first and second detection means signals and said timing means signals for processing the value of each second detection means signal applied thereto a fixed time after a first detection means signal from the same channel is applied thereto, said fixed time being independent for each channel and being internally available for said dedicated channels and being manifested by said timing signals for said variable channel.

11. The invention according to claim 10 wherein for selected ones of said channels said second detection means signal is processed only one fixed time after the provision of the first detecting means signal from these channels, and for the remaining ones of said channels, said second detecting means signal is processed first and second fixed times after the provision of the first detection means signal from the same channel.

12. The invention according to claim 10 wherein said apparatus further includes display and indicating means responsive to signals from said control means for displaying a value equal to the amount of a substance detected from any one channel and indicating to which channel said displayed value relates.

13. The invention according to claim 12
wherein said display and indicating means includes:
a depressable channel button for and assigned to each channel, each button having a light associated therewith, said light being capable of being on, off, or flashing in response to appropriate signals from said control means, the depression of each button causing a signal identifying the channel to which the depressed button is assigned to be applied to said control means, and
numeric display means responsive to signals applied from said control means for displaying the numeric value manifested by the control means signal applied thereto;
wherein said control means processes each second detection means signal at the fixed time therefor to determine the amount of the substance being detected in the channel including that second detection means, said control means thereafter providing a signal to turn on the light associated with the channel button assigned to that channel; and
wherein said control means responds to the signal provided thereto as a result of the depression of a channel button having the light associated therewith turned on by providing a signal to that channel button to cause the light associated therewith to flash and by providing a signal to said numeric display means manifesting channel button depressed to cause said numeric display means to display the amount of said substance detected in the channel to which said depressed button is assigned.

14. The invention according to claim 13 wherein said display and indicating apparatus further includes message display means for displaying a message in response to signals from said control means, said control means providing said signal to said message display means and further applying a signal to at least one of said channel buttons to cause said light associated therewith to flash whenever said message applies to the channel to which that channel button is assigned.

15. The invention according to claim 14 wherein said energy source provides visible and ultraviolet radiant energy.

16. The invention according to claim 15
wherein each of said reaction vessels is a solid rectangular shaped member having an open end and hollow interior; and
wherein each of said chambers has a rectangular shaped opening into which said vessel fits.

17. The invention according to claim 10 wherein said control means is a programmed digital computer.

18. The invention according to claim 10
wherein said apparatus further includes an assay reader for reading assay values prerecorded on an assay card and providing signals to said control means manifesting said assay values, said assay values manifesting known amounts of said selected number of substances present in a control serum; and
wherein said control means, in response to selected second detection means signals applied thereto as a result of reagentcontrol serum mixtures being detected and in response to said assay reader signals applied thereto, determining a scaling factor related to the ratio of the manifested assay value to said second detection means value, for selected substances, said scaling factor being used in the subsequent processing of second detection means signals to determine unknown amounts of selected ones of said selected substances.

* * * * *